Figure 1:
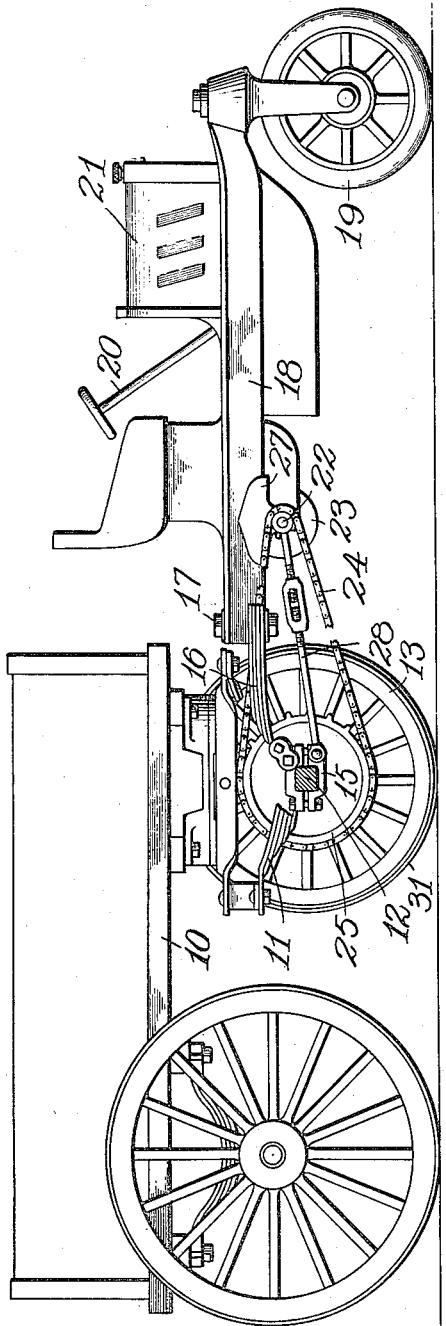

C. H. MARTIN.
VEHICLE.
APPLICATION FILED MAR. 29, 1911.

1,018,248.

Patented Feb. 20, 1912.

2 SHEETS—SHEET 1.

Witnesses
C. F. Mason
M. E. Regan.

Inventor
Charles H. Martin.
By Attorneys.
Southgate & Southgate.

C. H. MARTIN.
VEHICLE.
APPLICATION FILED MAR. 29, 1911.
1,018,248.
Patented Feb. 20, 1912.
2 SHEETS—SHEET 2.
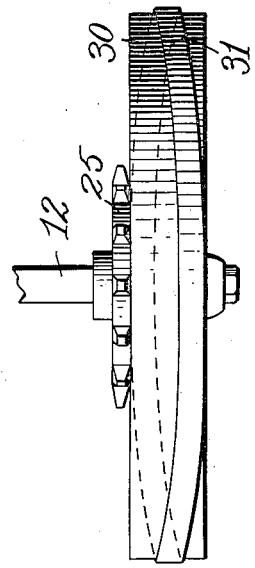
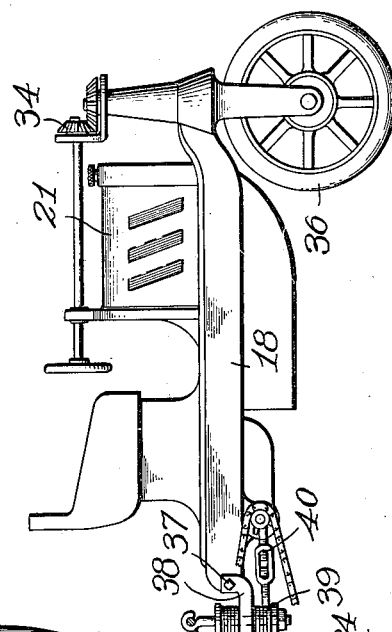
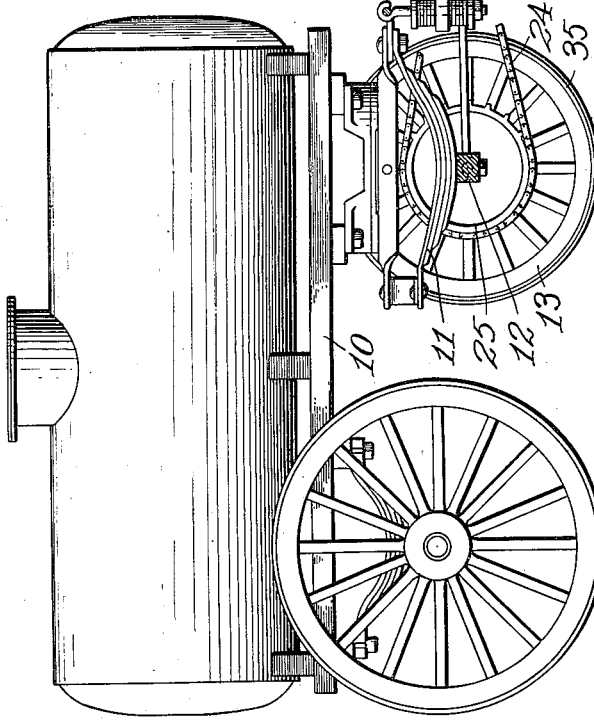
Witnesses
C. F. Wesson
M. E. Regan
Inventor
Charles H. Martin.
By Attorneys.
Southgate & Southgate.

UNITED STATES PATENT OFFICE.

CHARLES H. MARTIN, OF WORCESTER, MASSACHUSETTS.

VEHICLE.

1,018,248. Specification of Letters Patent. Patented Feb. 20, 1912.

Application filed March 29, 1911. Serial No. 617,576.

*To all whom it may concern:*

Be it known that I, CHARLES H. MARTIN, a citizen of the United States, residing at Worcester, in the county of Worcester and State of Massachusetts, have invented a new and useful Vehicle, of which the following is a specification.

This invention relates to a provision of trucks and other vehicles with means for supporting the motor, transmission, and steering mechanism independently of the body thereof.

Up to the present time, so far as I am aware, the practical progress that has been made in the art of transporting freight and passengers by motor power in city streets and common highways has taken the form of changing the design of the ordinary horse drawn vehicle in such a manner as to provide for placing the motor and steering gear thereon in a convenient way. This vehicle, as existing prior to the application of motor power thereto, was designed especially for supporting the load and as so designed had reached a very high point of development, but on account of being designed for this particular purpose, it is not particularly adapted to receive the motor, steering gear, and other elements necessarily accompanying the same. The changes necessitated by the addition of a motor reduce the durability and reliability of the truck. I do not consider this the best way to accomplish the desired result.

The principal objects of this invention are to provide a construction in which the ordinary horse-drawn vehicle, whether a truck or of other character, can be used substantially in the efficient, simple and reliable form in which it now exists, with motive power and steering mechanism supported independently thereof and connected thereto in such a way that the motor and steering gear will not be subjected to the heavy shocks which the loaded vehicle is designed to resist, so that all kinds of trucking can be done on a large scale by any desired kind of motive power with greatly increased efficiency over the best kinds of motor vehicles; to provide a construction in which without reducing the weight and strength of the vehicle for supporting the load, yet the motor and transmission machinery can be of a much lighter and cheaper construction than is the case with the ordinary motor vehicle, and yet be more efficient for the purpose intended, so that they will not have to withstand the inertia of the start and stop as is the common practice in the self-propelled vehicle of today, and will not have to be subjected to the sudden shocks and vibration coming from road shocks not being absorbed by the heavy springs which must be used for supporting the load of the ordinary motor vehicle; to provide a separate steering frame for such truck or vehicle to be removably connected, preferably to the front axle thereof, and suitable for carrying the motor and connected parts in such a way that the motor can be connected up with the front wheels of the truck or vehicle; whereby these front wheels can be used for tractive purposes; to provide such a steering frame with a front supporting steering wheel or wheels and without any driving wheels of its own so that it will simply become a motor vehicle when attached to the front wheels of the truck or other ordinary vehicle; and to provide means whereby the front wheels of the truck of the vehicle can be used as traction wheels, and whereby the same can be turned in such a way that the greatest facility can be secured in moving about and particularly in backing and for loading and unloading.

Reference is to be had to the accompanying drawings, in which—

Figure 2:
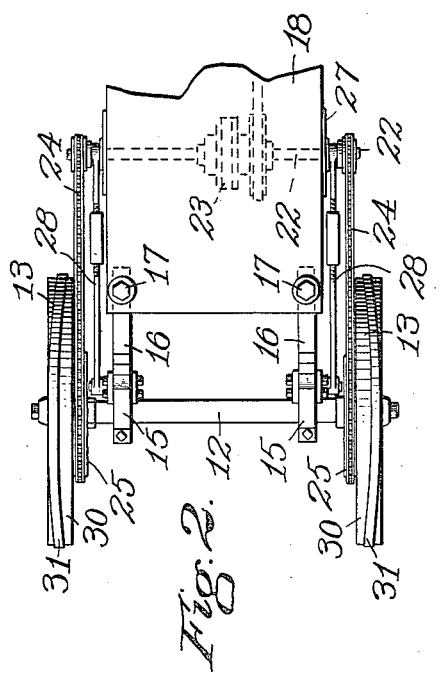

Figure 1 is a side view of one embodiment of the invention; Fig. 2 is a partial plan thereof; Fig. 3 is a plan of one of the front traction wheels shown in Figs. 1 and 2, and Fig. 4 is a side view of another form of the invention.

Referring first to the first two figures, the invention is shown as applied to an ordinary vehicle or truck having the usual body 10, stiff springs 11 and front axle 12, and provided with front wheels 13. To this front axle are removably secured clamps 15 on which are mounted springs 16 shown in the present case as multiple leaf springs. These springs are softer and more readily yielding than the springs 11, and are connected at the front by bolts 17 with the rear of a frame 18 so as to constitute a yielding rear support therefor. It will be understood that these parts are connected with the axle when the tongue is removed therefrom. This frame 18 is shown in this case as provided with a single front steering wheel 19 and a steering handle 20. The front steering wheel preferably is made resilient, as by providing it with a pneumatic tire. The connections between the steering handle and steering wheel are not herein shown in detail as they form no part of the present invention and may be of any desired kind and character. On the body of the frame 18 is located a motor 21 which may be of any desired kind and is connected in any of the usual ways with a driving shaft 22. This driving shaft is made in two sections connected by a differential 23 of any well-known construction, and each of these sections is connected by a chain 24 with a sprocket wheel 25 on one of the front wheels 13. In this way the front wheels can be driven independently of each other as is well understood in this art so as to turn the device quickly and in its own complete length. The hangers 27 on which the shaft 22 is located are pivotally connected with adjustable strut rods 28 which are pivotally connected with the clamps 15. While adjustable strut rods are well known, the provision of this feature in this case is important, because of the springs 16. These springs are provided in order that the motor 21 may be supported resiliently and may be capable of slight vertical motions, independently of the front axle and body, and so that the shocks and jars to which the wheels 13 and load are subjected will be absorbed. At the same time it will be observed that the load supported by the main vehicle is not necessarily deprived of the stiff (and usually resilient) support by which it is carried on the axles in the ordinary vehicle of this kind.

At this point it may be well to call attention to the fact that in the ordinary construction of motor vehicles the springs by which the load is carried must be so stiff as properly to support the load, and therefore they are much too stiff for the motor. The motor being a delicate piece of mechanism compared with the truck itself, the motor trucks now in use have been found defective in this respect and much invention has had to be brought forth for the purpose of overcoming it. This, however, is going at it in the wrong way, because it involves attempts to improve the already highly efficient and extremely simple truck, which is fully suitable for the purpose of carrying heavy loads. The ordinary horse-drawn vehicle or truck does not readily lend itself to the use of the motor thereon. The use of my arrangement permits of a much greater economy in operation and first cost of equipment than has been possible with any kind of motor vehicle so far designed, particularly for carrying freight, in which the motor transmission mechanism and steering devices are combined with the vehicle itself.

Even where the invention is used with a truck or vehicle not having the front springs 11, the same advantages are secured, and in fact it is then even more necessary. Another important point which is to be observed is that the front wheels of the load bearing vehicle, being used for traction wheels, ordinary smooth steel tires cannot be employed upon them with advantage. Accordingly I have provided for the use of tires which have tractive power. In the form of the invention shown in Figs. 1, 2 and 3, they are formed in the following way:—Each of these wheels has a steel rim 30 which may be connected with the hub by spokes or web or in any other desired way and which is to all appearances like any ordinary steel tire. In fact it can be in the form of a steel tire shrunk on a wooden felly as is shown in the drawings. This steel tire or rim is not used for tractive purposes, but is used simply for strength and rigidity. In addition to this it is provided with a wide tractive external tread 31 preferably formed of steel shrunk on to the rim and having a sinuous or zigzag form around the circumference of the wheel. In this manner its curvature is changing constantly at all points and whenever the power is applied to turn the wheel, either one side or the other of this tread 31 will be able to get a hold on the road surface, as no matter which way it is going one side is at a slight forward inclination to the direction of motion. This is an important feature of the invention.

In the form of the invention shown in Fig. 4 substantially the same conditions prevail, but in this case the front wheels 13 are provided with tires 35 formed of rubber and having therefore a tractive surface. It can be assisted by any of the ordinary devices for this purpose. Mechanism 34 is shown for operating the steering wheel. In this case also instead of the axle itself being directly connected with the body 18 of the steering device the fifth wheel 36 of the truck is connected by bolts 37 with brackets 38 on the rear of the body 18, these brackets being supported at the bottom of the bolts by soft springs 39 having the same purpose as the springs 16. The adjustment of the strut 40 is also shown.

One advantage that would result by the use of my invention is that the owner of a horse drawn vehicle or a number of horse drawn vehicles need not dispose of or have rendered useless his present equipment by the adoption of motive power, as would be the case were he to use the ordinary motor vehicle. Another advantage of the use of my invention is that in case of an accident to the motive power drawing the vehicle, another complete power plant could be substituted in a few minutes and the vehicle not rendered useless where repairs were being made as is the case with the ordinary motor vehicle. In this way a plurality of truck bodies can be owned by a person or company using this system much larger than the number of motor vehicles, and an accident to the part of the mechanism that supports the load need not put the motor itself out of commission as that can be used for drawing other trucks while the injured one is being repaired. Also when a plurality of motors are used, an accident to one does not tie up a single truck or load thereon. Moreover, the use of this principle permits much greater economy in operation than has been possible with any kind of motor truck in which the motor is combined with the truck and also much greater than in the case of the use of horses where much work is to be done.

While I have illustrated and described two preferred embodiments of the invention, I am aware that it can be carried out in other ways and that the invention is not restricted to the particular details of construction herein shown and described.

What I do claim is:—

1. The combination with a vehicle having a front axle adapted to turn on a vertical axis, wheels thereon, and springs on the axle for supporting the vehicle body, of a frame comprising a body, springs connected therewith, more readily yielding than the springs on the axle, for supporting said frame at the rear from said front axle, means at the front for supporting and steering it, and a motor on said frame connected with said front wheels for driving them.

2. The combination with a vehicle having a front axle, wheels and springs thereon, of a frame provided with a front steering wheel or wheels, a more readily yielding spring independent of said vehicle connecting said frame at the rear with said front axle, and a motor on said frame geared up to the front wheels of the truck.

3. The combination with a vehicle having a front axle, wheels thereon, and a body supported at one end by said axle, of a frame provided with a front steering wheel or wheels and having means at the rear more resilient than the connections between the axle and body for movably supporting said frame from said front axle so that it is free to move vertically independently of said front axle and body, and a motor on the frame geared up to the front wheels of the vehicle.

4. The combination with a vehicle having a front axle and wheels thereon, of a frame provided with a front steering support and yieldingly connected at the rear with said front axle, a power shaft on said frame, adjustable strut rods removably connecting said shaft with said front axle, and a motor on said frame geared up to the front wheels of the vehicle through said shaft.

5. The combination with a vehicle having a front axle adapted to turn on a vertical axis, and provided with traction wheels thereon, of a frame comprising a body resiliently supported at the rear by said front axle independently of the rest of said vehicle and having a front supporting means, a motor on the frame connected with said front wheels, transmission mechanism on said frame, and a steering device on said frame independent of said vehicle.

In testimony whereof I have hereunto set my hand, in the presence of two subscribing witnesses.

CHARLES H. MARTIN.

Witnesses:
C. FORREST WESSON,
E. M. ALLEN.